US010094254B2

(12) United States Patent
Miyajima et al.

(10) Patent No.: US 10,094,254 B2
(45) Date of Patent: Oct. 9, 2018

(54) TEMPERATURE SENSITIVE VALVE MECHANISM

(71) Applicant: YAMADA MANUFACTURING CO., LTD., Kiryu-shi, Gunma (JP)

(72) Inventors: Junichi Miyajima, Kiryu (JP); Kazuo Shoji, Kiryu (JP); Yuya Kato, Kiryu (JP)

(73) Assignee: YAMADA MANUFACTURING CO., LTD., Kiryu-Shi (JP)

( * ) Notice: Subject to any disclaimer, the term of this patent is extended or adjusted under 35 U.S.C. 154(b) by 0 days.

(21) Appl. No.: 15/467,234

(22) Filed: Mar. 23, 2017

(65) Prior Publication Data

US 2017/0284243 A1   Oct. 5, 2017

(30) Foreign Application Priority Data

Apr. 1, 2016  (JP) ................................. 2016-074713
Nov. 28, 2016  (JP) ................................. 2016-230069

(51) Int. Cl.

| F01M 5/00 | (2006.01) |
|---|---|
| F01P 11/08 | (2006.01) |
| F16K 3/24 | (2006.01) |
| F16K 31/00 | (2006.01) |
| F01M 1/16 | (2006.01) |

(52) U.S. Cl.
CPC .............. F01M 5/007 (2013.01); F01M 1/16 (2013.01); F01P 11/08 (2013.01); F16K 3/24 (2013.01); F16K 31/002 (2013.01); F01P 2025/40 (2013.01)

(58) Field of Classification Search
CPC ........ F01M 5/007; F01M 1/16; F16K 31/002; F16K 3/24; F01P 11/08
See application file for complete search history.

(56) References Cited

U.S. PATENT DOCUMENTS

2015/0275714 A1*  10/2015  Lauria .................... F01M 5/002
123/196 AB

FOREIGN PATENT DOCUMENTS

JP          08-093430          4/1996

* cited by examiner

*Primary Examiner* — Jacob Amick
(74) *Attorney, Agent, or Firm* — Rankin, Hill & Clark LLP

(57) ABSTRACT

A pump housing has a main oil passage, a return oil passage provided substantially in parallel with the main oil passage, and a valve insertion hole extending across the main oil passage such that a closed fore end of the valve insertion hole reaches in the vicinity of the return oil passage. The valve insertion hole has a female screw formed at an open end thereof, and a through-hole is formed in the pump housing, having one end connected to the valve insertion hole at a portion adjacent to the closed fore end thereof and an opposite end opened to the outside of the pump housing. With the valve insertion hole thus provided, a temperature sensitive valve mechanism can be readily inserted in the valve insertion hole at any time.

10 Claims, 16 Drawing Sheets

(EMBODIMENT)

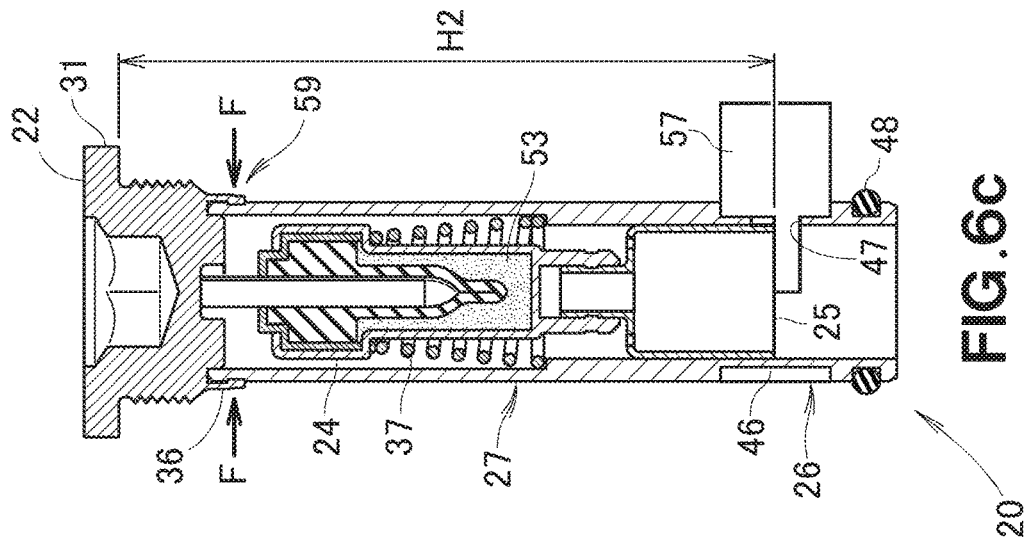
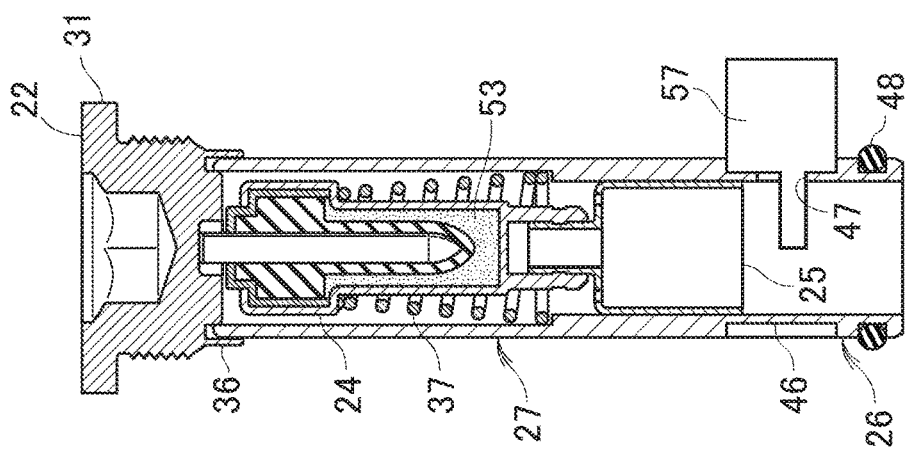
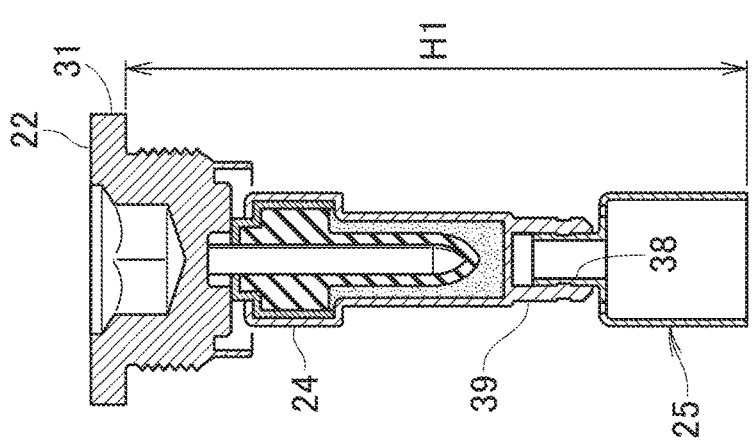

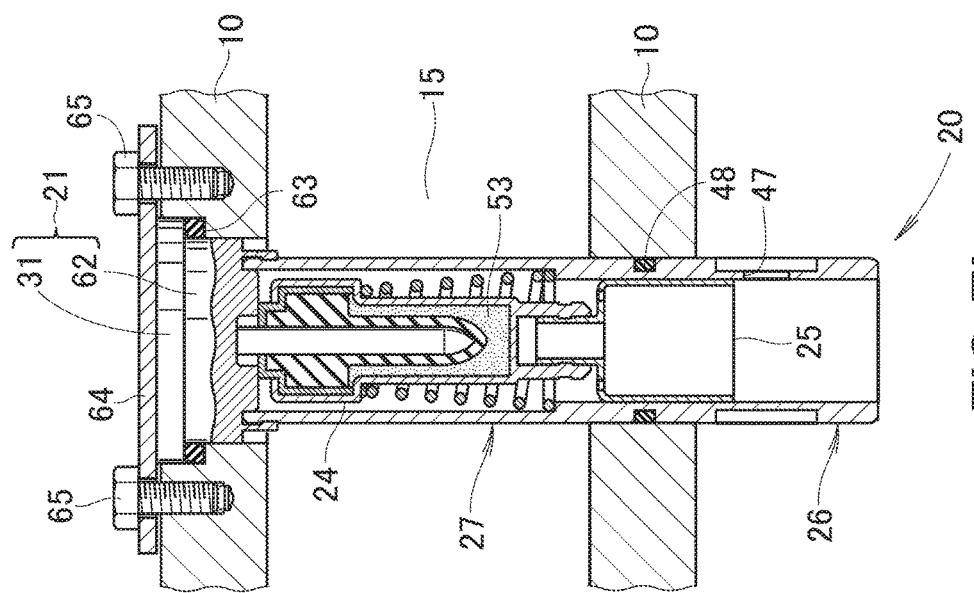
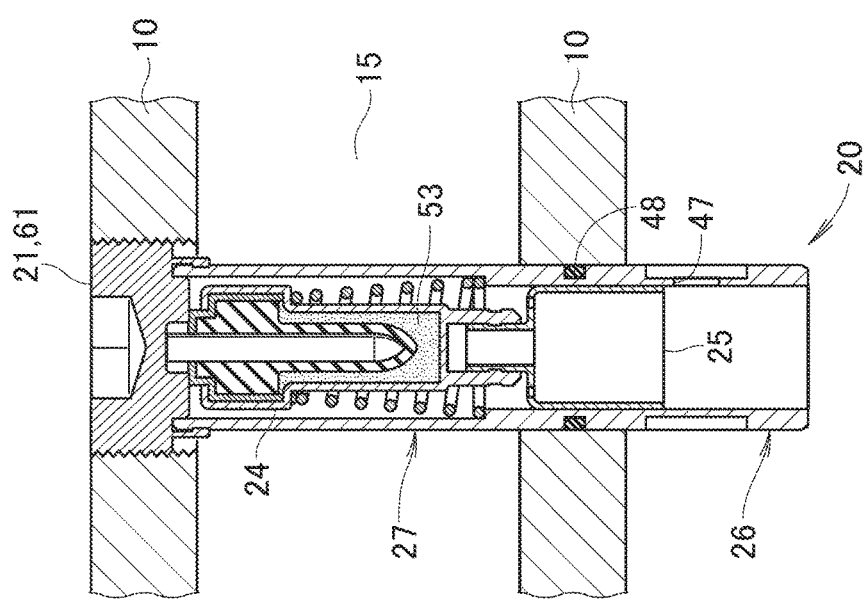

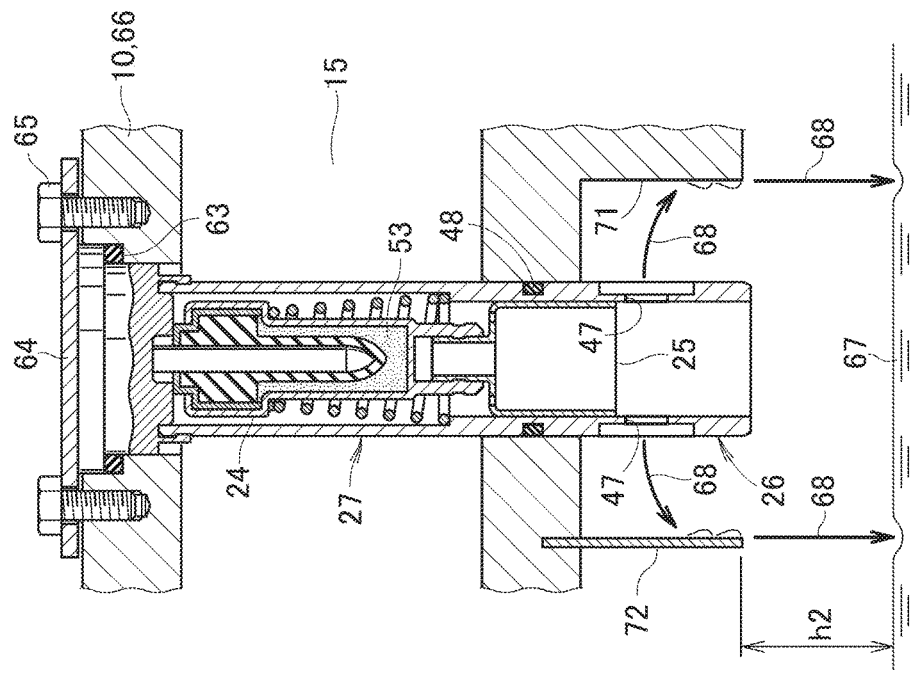
FIG. 8a (COMPARATIVE EXAMPLE)
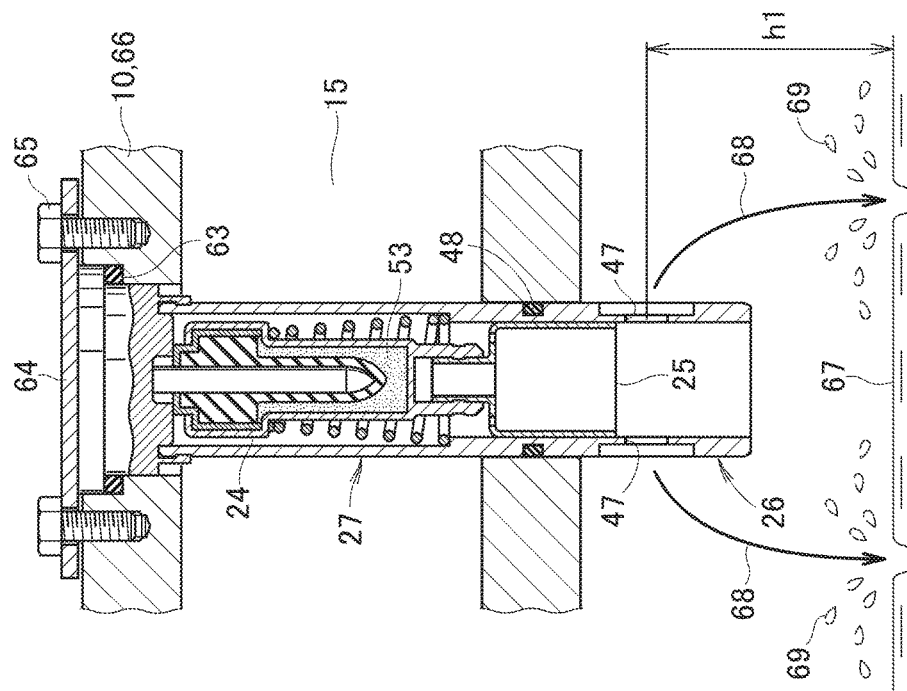
FIG. 8b (EMBODIMENT)

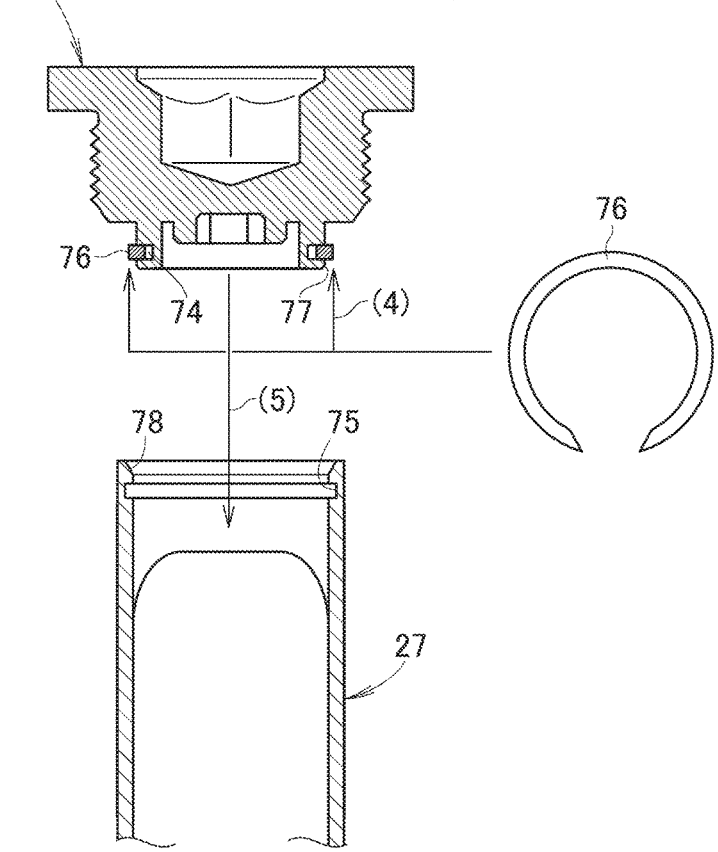
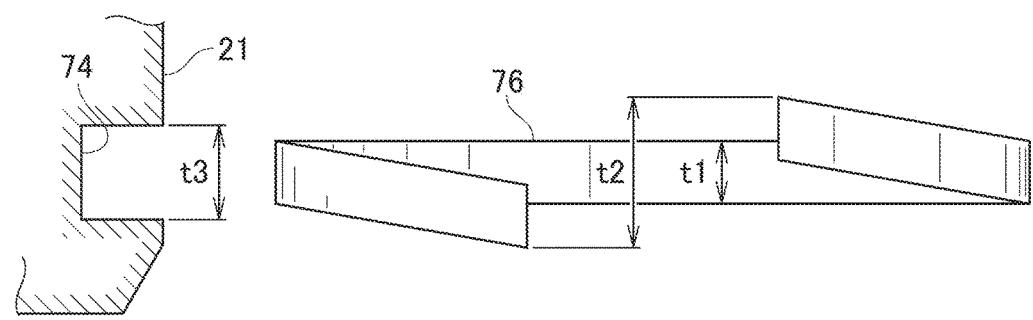

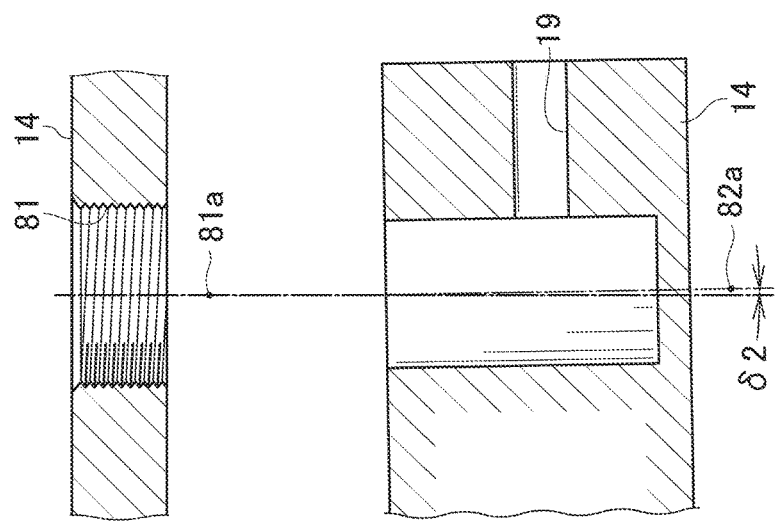
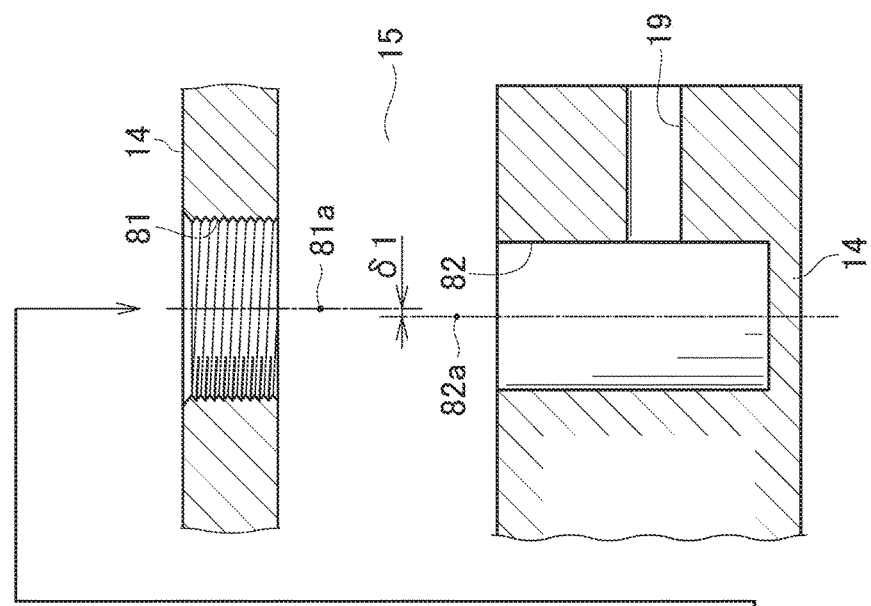
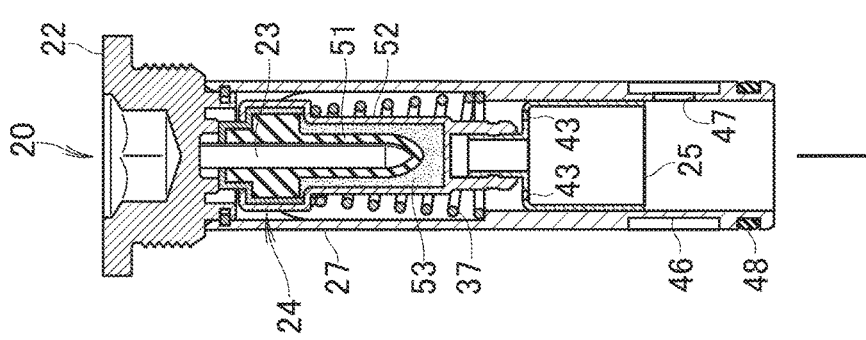
FIG. 12a
FIG. 12b

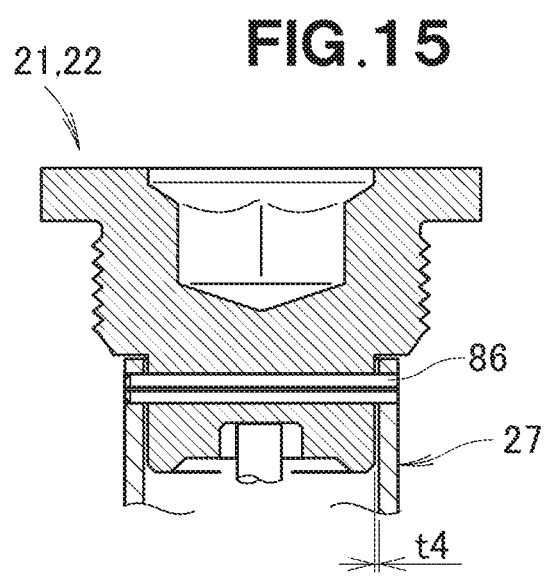

TEMPERATURE SENSITIVE VALVE MECHANISM

FIELD OF THE INVENTION

The present invention relates to a temperature sensitive valve mechanism mounted in a structural member (such as a pump housing or a cylinder block) having an oil passage so as to release a lubricating oil to the outside of the oil passage in response to a temperature of the lubricating oil flowing in the oil passage.

BACKGROUND OF THE INVENTION

Temperature sensitive valves mounted in a cylinder block of an internal combustion engine for releasing a lubricating oil to the outside of an oil passage in response to a temperature of the lubricating oil flowing in the oil passage are known as disclosed, for example, in Japanese Patent Application Laid-open Publication (JP-A) No. H08-93430.

As shown in FIG. 7 of JP H08-93430A, a cylinder block includes a lubrication oil supply passage, a bypass hole, a through-hole, and a temperature sensitive valve.

The bypass hole is closed by a top surface of the temperature sensitive valve. As the temperature of a lubricating oil goes down, the temperature sensitive valve contracts, causing the top surface of the temperature sensitive valve to separate from the bypass hole. Thus, the lubricating oil in the supply passage is allowed to bypass the temperature sensitive valve and discharged from the through-hole. By thus releasing the lubricating oil at a low temperature, it is possible to lower the engine loads to thereby reduce fuel consumption of the internal combustion engine.

In general, a valve mechanism is constituted by a valve and a valve casing in which the valve is housed. In case of JP H08-93430A, the cylinder block corresponds to the valve casing, and the temperature sensitive valve corresponds to the valve. A distance between the bypass hole and the temperature sensitive valve provides a valve opening. Thermal performance of the valve mechanism can be determined by a correlation between the lubricating oil temperature and the valve opening.

In the structure shown in JP H08-93430A, the temperature sensitive valve and the cylinder block are immersed in a liquid tank or placed in a thermostatic tank when determining thermal performance of the valve mechanism. The temperature sensitive valve is a small-sized component, however, the cylinder block is a medium-sized or large-sized component, so that performance determination of the valve mechanism necessarily involves high cost.

A demand for a reduction in cost of the cylinder block or the like structural member also causes a need for a technique which is capable of reducing cost for performance determination of the temperature sensitive valve.

SUMMARY OF THE INVENTION

It is therefore an object of the present invention to provide a temperature sensitive valve mechanism which is capable of determining thermal performance thereof at a low cost.

According to the present invention, there is provided a temperature sensitive valve mechanism mounted in a structural member having an oil passage so as to release a lubricating oil to the outside of the oil passage in response to a temperature of the lubricating oil flowing in the oil passage, the temperature sensitive valve mechanism comprising: a fixing part fixed to the structural member; a thermoelement disposed in the oil passage and having a first end supported by or made in contact with the fixed part; a valve element fixed to a second opposite end of the thermoelement; a valve casing surrounding the valve element; and a connecting part extending from the fixing member in such a manner as to surround the valve element and supporting the valve casing, the connecting part having oil passage through-holes for allowing the lubricating oil to pass therethrough and hit on the thermoelement, wherein the valve casing has a discharge port adapted to be opened and closed by the valve element for releasing the lubricating oil therefrom to the outside of the oil passage.

Since the valve element and the valve casing are attached to the fixing part, the temperature sensitive valve mechanism including the fixing part, the valve element and the valve casing can be solely subjected to determination of valve characteristics such as valve opening. With this arrangement, installation of a cylinder block or the like structural member in a water tank or a thermostatic tank as required in a conventional thermal performance determination is no longer necessary. According to the invention, the temperature sensitive valve mechanism which is small in size and light in weight is solely installed in the water tank or the thermostatic tank. As a result, performance determination of the temperature sensitive valve mechanism can be achieved with reduced cost.

In one preferred form of the present invention, the connecting part and the valve casing are formed integrally with each other. Integration of the valve casing and the connecting part provides a reduction in the number of component parts and a reduction of assembling man-hours.

In another preferred form of the present invention, the connecting part and the valve casing are separate members structurally independent from one another, and the valve casing is joined to the connecting part via a clenched portion or a screw-connected portion. With this arrangement, the connecting part and the valve casing can be joined together while dimensional adjustment is performed after a relative position between the discharge port and valve element is fixedly determined. Manufacturing tolerances which are inevitably involved in the component parts can thus be taken out or cancelled, and valve characteristics can be determined with increased accuracy.

Preferably, the connecting part is joined to the fixing part via a clenched portion or a screw-connected portion. This arrangement ensures that the connecting part and the valve casing can be joined together while dimensional adjustment is performed after a relative position between the discharge port and valve element is fixedly determined. Manufacturing tolerances which are inevitably involved in the component parts can thus be taken out or cancelled, and valve characteristics can be determined with increased accuracy.

It is preferable that the connecting part is joined to the fixing part via a clenched portion, and the clenched portion is a portion joined by clenching performed to cause deformation over the entire periphery thereof. By virtue of the clenched portion formed by clenching performed to cause deformation over the entire periphery of the connecting part, a tilt and a center offset can be suppressed and smooth sliding movement of the valve element as well of highly accurate hydraulic control of the valve element can be attained.

In one preferred form of the invention, the connecting part is joined to the fixing part via a circlip. The circlip is received in clip reception grooves and allowed to move within the clip reception grooves. The connecting part is movable relative to the structural part within a slight extent.

The fixing part and the connecting part are both attached to the structural member, however, it may occur that a center axis of a hole in which the connecting part is attached and a center axis of another hole in which the fixing part is attached are offset or tilt relatively to each other due to, for example, manufacturing errors during machining processes, temperature differences during operation, or aging after prolonged use. The center offset and the tilt can be taken out or cancelled via relative movement of the circlip within the clip reception grooves. This arrangement facilitates easy attachment of the temperature sensitive valve mechanism and insures a long service life of the temperature sensitive valve mechanism.

Preferably, the groove width of a clip reception groove in which the circlip is received is set to be larger than a thickness of the circlip, and the circlip is in the form of a spring washer. In an arrangement in which the circlip is fitted in the clip reception grooves, the circlip or the clip reception grooves are slightly movable in a longitudinal or axial direction of the fixing part. According to the invention, however, since the circlip is formed by the spring washer, movement of the circlip or the clip reception grooves can be suppressed by the effect of a spring force of the spring washer.

Preferably, the connecting part has a plurality of through-holes provided along the clip reception groove. By virtue of the through-holes provided along the clip reception groove of the connecting part, it is possible to confirm a condition of the circlip by, for example, visual inspection performed through the through-holes. In case where a defect is detected, suitable jigs are inserted into the through-holes to thereby contract the diameter of the circlip. While keeping this condition, the connecting part is detached from the fixing part and thereafter reassembling can be performed.

It is preferable that the structural member, the valve casing and the connecting part are formed of aluminum alloys. With this arrangement, thermal expansion coefficients of the respective component part are nearly equal to one another so that a clearance between the structural member and the valve casing and a clearance between the structural member and the connecting part can be reduced to a minimum. By thus minimizing the clearances, a leakage of the lubricating oil from the clearances can be minimized. Even when a seal member provided on an outer periphery of the valve casing or the connecting part is omitted, a remarkable oil leakage does never take place and highly accurate control can be performed.

Preferably, the structural member is a cylinder block of an engine, and the cylinder block has a wall or a plate disposed such that the lubricating oil discharged from the discharge port hits on the wall or the plate before dropping into an oil reservoir of the cylinder block. In an arrangement in which the lubricating oil discharged from the discharge port is allowed to fall directly into an oil reservoir, splashes are produced and air is entrained in the splashes. As a consequence, an increased amount of undesirable bubbles is contained in the lubricating oil. According to the invention, however, by virtue of the wall or the plate provided on the cylinder block, the lubricating oil discharged from the discharge port hits on the wall or the plate before dropping into the oil reservoir. With this arrangement, since the lubricating oil flows downward along the wall or the plate, splashes are unlikely to produce and an amount of air entrained in the splashes can be reduced to an allowable extent.

BRIEF DESCRIPTION OF THE DRAWINGS

FIGS. 6(a), 6(b) and 6(c) are views showing assembling procedures of the temperature sensitive valve mechanism according to the present invention;

FIGS. 7(a) and 7(b) are views illustrative of operation of a temperature sensitive valve mechanism according to another modified embodiment of the present invention;

FIGS. 8(a) and 8(b) are views showing a positional relationship between the temperature sensitive valve mechanism according to the present invention and a cylinder block;

FIGS. 10(a) and 10b are enlarged cross-sectional view of a portion of FIG. 9;

FIGS. 12(a) and 12(b) are views showing a positional relationship between the circlip and a pump housing;

FIG. 15 is a view showing an assembled state of the portion of the temperature sensitive valve mechanism using the spring pin; and FIGS. 16(a), 16(b), 16(c) and 16(d) are views showing modifications of a connecting part of the temperature sensitive valve mechanism.

DETAILED DESCRIPTION OF THE PREFERRED EMBODIMENTS

Figure 1:
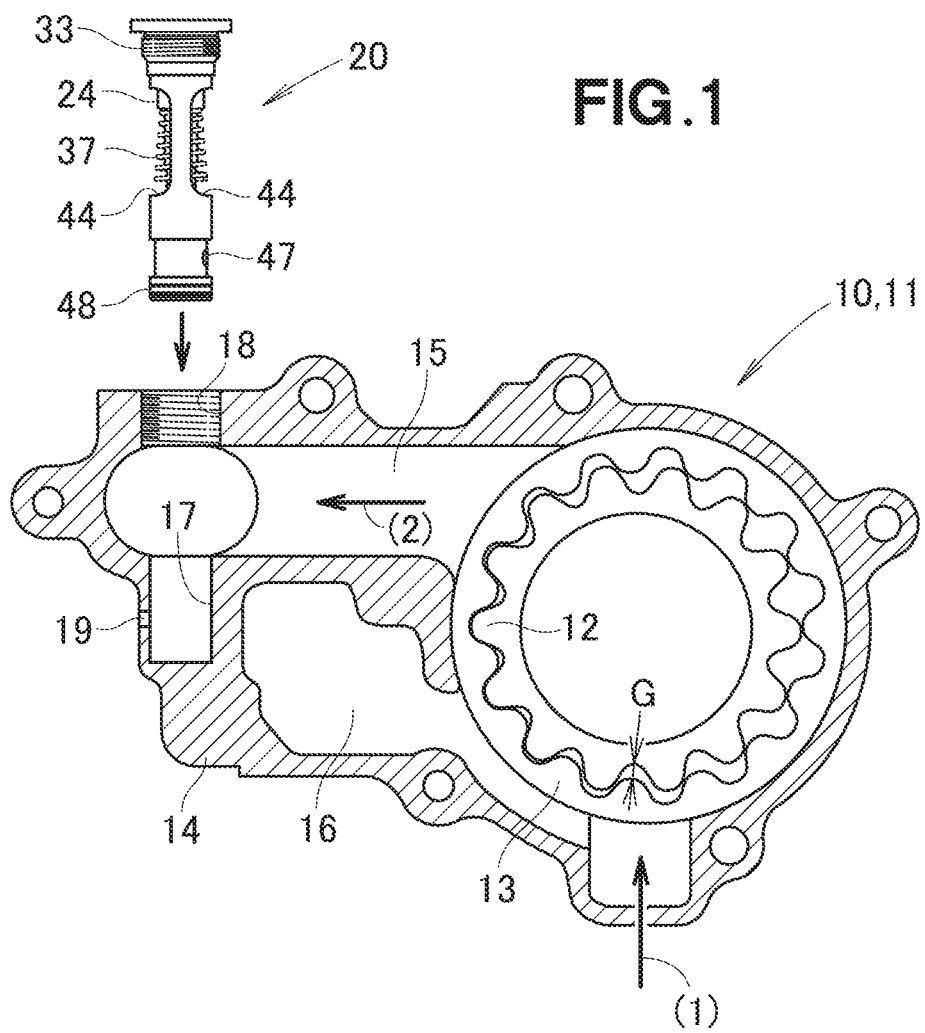
FIG. 1 is a diagrammatical view showing a positional relationship between a temperature sensitive valve mechanism according to the present invention and an oil pump.

Certain preferred embodiments of the present invention will be described in detail below, by way of example only, with reference to the accompanying drawings, in which the drawings should be viewed in the direction of reference characters.

Referring now to FIG. 1, a description will be made about an embodiment in which a temperature sensitive valve mechanism 20 of the present invention is detachably mounted in a structural member 10 comprised of an oil pump 11. As shown in FIG. 1, the oil pump 11 as the structural member 10 comprises an inner gear 12, an outer gear 13, and a pump housing 14 containing the inner gear 12 and the outer gear 13. When the inner gear 12 is rotated by a part of engine power, the outer gear 13 is rotated with rotation of the inner gear 12. During this rotation, a gap G between the inner gear 12 and the outer gear 13 changes in volume to thereby cause a lubricating oil to be sucked in as indicated by the arrow (1), then compressed, and finally discharged therefrom as indicated by the arrow (2).

The pump housing 14 has a main oil passage 15 as an oil passage, and a return oil passage 16 provided substantially in parallel with the main oil passage 15. When the main oil passage 15 is at a high oil pressure, the lubricating oil is returned to the return oil passage 16 by a general return valve (not shown). The pump housing 14 further has a valve insertion hole 17 extending across the main oil passage 15 such that a closed fore end of the valve insertion hole 17 reaches in the vicinity of the return oil passage 16. The valve insertion hole 17 has a female screw 18 formed at an open end thereof, and a through-hole 19 is formed in the pump housing 14, having one end connected to the valve insertion hole 17 at a portion adjacent to the closed fore end thereof and an opposite end opened to the outside of the pump housing 14. With the valve insertion hole 17 thus provided, the temperature sensitive valve mechanism 20 can be readily inserted in the valve insertion hole 17 at any time.

Figure 2:
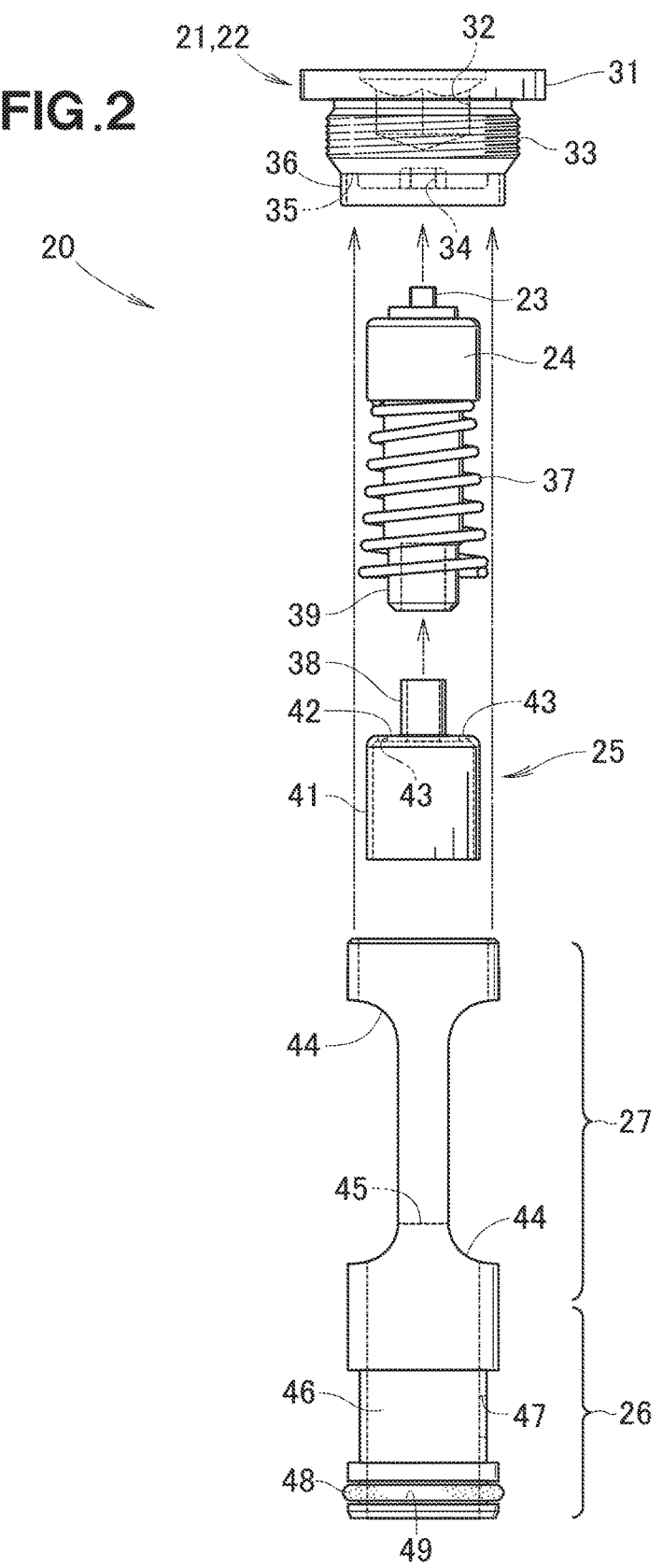
FIG. 2 is an exploded view of the temperature sensitive valve mechanism according to a preferred embodiment of the present invention.

A structure of the temperature sensitive valve mechanism 20 will be described below with reference to FIG. 2. As shown in FIG. 2, the 20 generally comprises a flanged plug 22 as a fixing part 21, a thermoelement 24 having one end (more particularly a piston 23 in the illustrated embodiment) supported by the flanged plug 22, a valve element 25 fixed to an opposite end of the thermoelement 24, a valve casing 26 surrounding the valve element 25, and a connecting part 27 extending from flanged plug 22 and supporting the valve casing 26.

The flanged plug 22 has an upper portion provided with a flange 31 and a hexagonal hole 32, and an axially intermediate portion provided with a mail screw 33. A lower portion of flanged plug 22 has a central recess 34 for receiving one end of the piston 23, an annular groove 35 for insertion of an upper portion of the connecting part 27, and a first cylindrical portion 36 surrounding the annular groove 35 for clenching. The flanged plug 22 can be rotated by turning a hexagonal wrench with an end of the wrench being inserted in hexagonal hole 32. The hexagonal hole 32 can be omitted in which instance the flange 31 is formed into a polygonal shape.

The thermoelement 24 is provided with a return spring 37. An internal structure of the thermoelement 24 will be described below with reference to FIG. 4. The thermoelement 24 also includes a second cylindrical portion 39 at a lower part thereof, the second cylindrical portion 39 surrounding a small-diameter extension part 38 extending from the valve element 25.

The valve element 25 comprises a valve cylindrical portion 41, a lid portion 42 closing an upper end of the valve cylindrical portion 41, and the small-diameter extension part 38 extending upwardly from the lid portion 42 and having a smaller diameter than the valve cylindrical portion 41. The lid portion 42 has a plurality of through-holes 43 extending vertically therethrough. The small-diameter extension part 38 is of a hollow shape so that the small-diameter extension part 38 can be easily inserted in the second cylindrical portion 39 while releasing air to the outside of the small-diameter extension part 38.

In the illustrated embodiment, the valve casing 26 and the connecting part 27 are formed integrally with each other. This structure is advantageous in that the number of component parts is small and assembling man-hours can be reduced. The valve casing 26 and the connecting part 27 may be separate members structurally independent from one another, as will be described later.

The connecting part 27 comprises a cylindrical body having a pair of diametrically opposed oil passage through-holes 44, 44 for allowing passage therethrough of the lubricating oil. The connecting part 27 includes a spring retaining portion 45 provided at a lower portion thereof for retaining the return spring 37. The valve casing 26 comprises a cylindrical body configured such that the valve element 25 is axially slidably received in the valve casing 26. The valve casing 26 has an annular groove 46 and a discharge port 47 formed in an axially intermediate portion thereof, and a circumferential groove 49 formed in a lower portion thereof for receiving a seal member 48. In the valve casing 26, a part of the periphery of the discharge port 47 is made thin so as to have a smaller diameter than other parts over the entire periphery of the valve casing 26. With this arrangement, the lubrication oil can be smoothly discharged irrespective of the phase or position of the discharge port 47.

It is desirable that the aperture width of the oil passage through-holes 44 is made larger than an outside diameter of the thermoelement 24. With this arrangement, the passage resistance of the oil passage through-holes 44 can be reduced. To achieve a further reduction of the passage resistance, the oil passage through-holes 44 are aligned in phase with the main oil passage 15. The number of the oil passage through-holes 44 is not limited to two as in the illustrated embodiment, but three or more oil passage through-holes 44 can be used. The valve casing 26 and the connecting part 27 are manufactured by casing, forging, cutting (cut machining), or a combination thereof. The discharge port 47 is preferably cut-machined as it requires a precise opening area.

Figure 3:
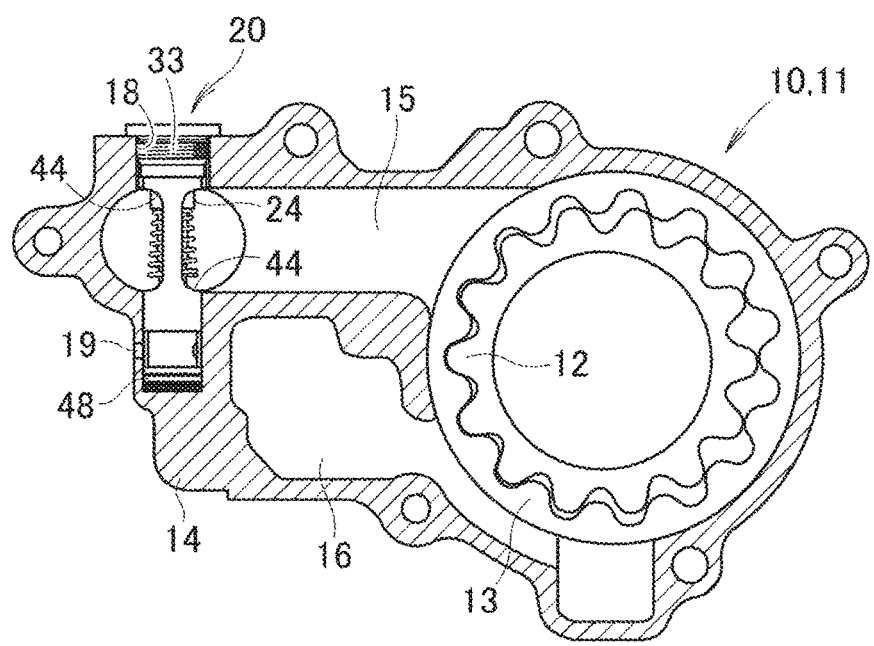
FIG. 3 is a view showing the oil pump equipped with the temperature sensitive valve mechanism according to the present invention.

As shown in FIG. 3, the male screw 33 is threaded into the female screw 18 so that the temperature sensitive valve mechanism 20 is mounted in the pump housing 14. In this instance, the flanged plug 22 can be viewed from the main oil passage 15 through oil passage through-holes 44. The lubricating oil is allowed to flow through the oil passage through-holes 44, the lubricating oil flowing in the main oil passage 15 is always in contact with the thermoelement 24.

Figure 4B:
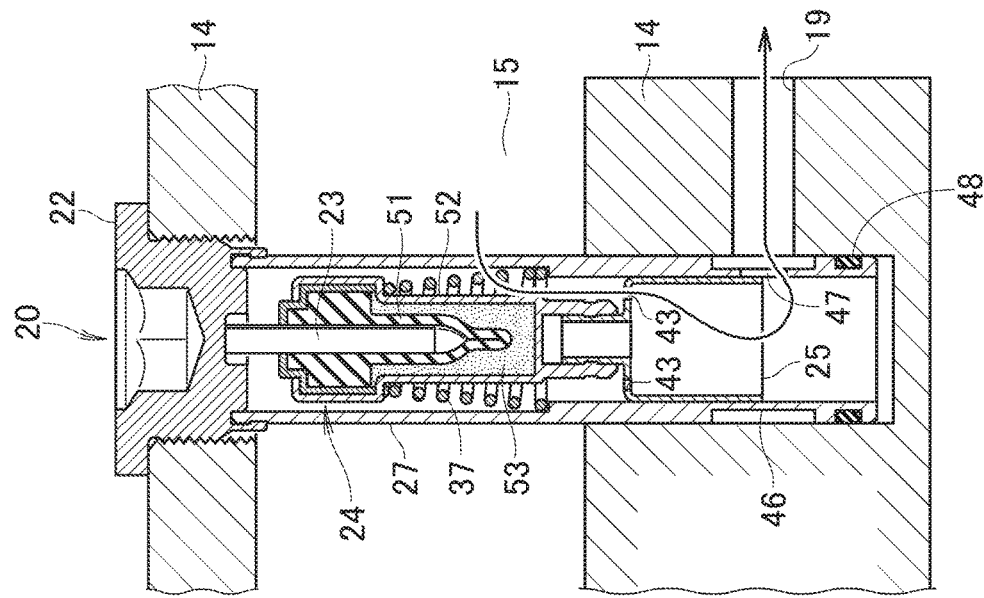
FIGS. 4(a) and 4(b) are views illustrative of operation of a thermoelement of the temperature sensitive valve element.
Figure 4A:
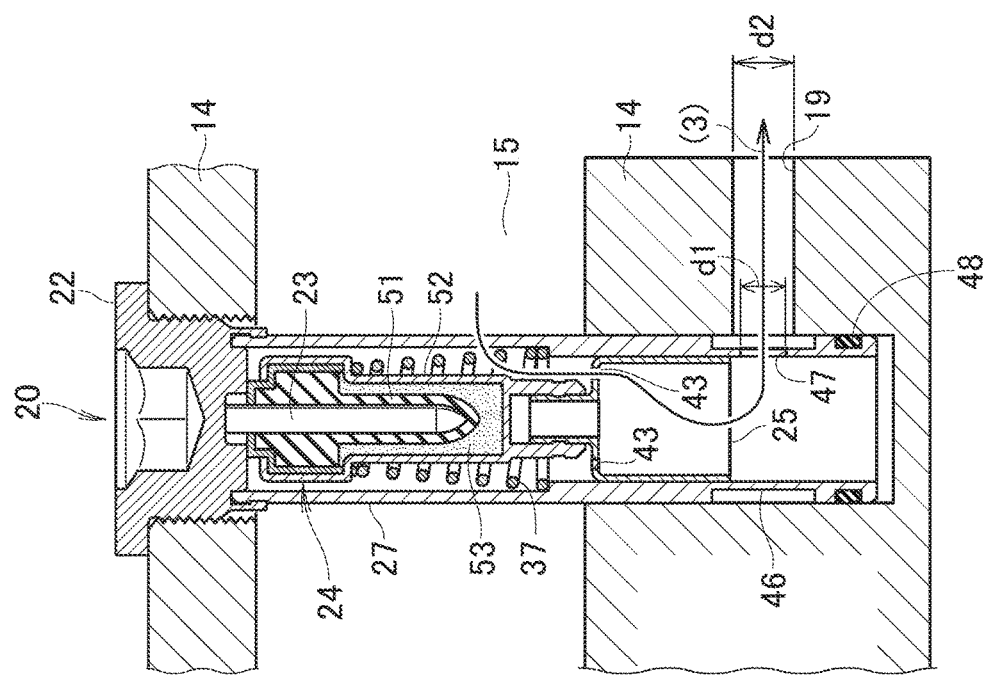

As shown in FIG. 4(a), the thermoelement 24 comprises the piston 23, an elastic film 51 surrounding or covering the piston 23, a case 52 housing the elastic film 51, and a thermo-wax 53 filled between the case 52 and the elastic film 51. When the temperature of the lubricating oil is low, the thermo-wax 53 is in a contracted state so that the valve element 25 does not interfere with (or overlap) the discharge port 47 of the valve casing 26. As a result, the lubricating oil is allowed to flow in a direction of the arrow (3). In other words, the lubricating oil flows successively through the through-holes 43, the discharge port 47, and the through-hole 19 of the pump housing 14 and eventually it is discharged into an oil reservoir 67 described later on.

An increase in temperature of the lubricating oil causes the thermo-wax 53 to expand and increase its volume whereupon a projecting length of the piston 23 increases, as shown in FIG. 4(b). Since the piston 23 is in abutment with the flanged plug 22, the case 52 and the valve element 25 are displaced toward the discharge port 47. As a consequence, about a half of the opening area of the discharge port 47 is closed by the valve element 25, for example. As the temperature of the lubricating oil rises further, the thermo-wax expands further and the volume of the thermo-wax increases further. As a result, the discharge port 47 is fully closed by the valve element 25. When the temperature of the lubricating oil is lowered, the thermo-wax 53 contracts and the valve element 25 is retuned from the position of FIG. 4(*b*) to the position of FIG. 4(*a*) by virtue of the action of the return spring 37.

The discharge port 47 and the through-hole 19 are important elements from a viewpoint of the flow ability of the lubricating oil. The discharge port 47 is preferably a cut-machined hole formed by cut-machining, as previously described, whereas the through-hole 19 may be a cut-machined hole or a hole as cast (as-cast hole).

The as-cast hole will be described in detail. In case where the pump housing 14 is a cast article, the through-hole 19 may be an as-cast hole. To form an as-cast hole, a core is set in a cast mold, and while keeping this condition, a molten metal is filled in the mold. In case of a die-cast molding method, the core is removed from the cast mold. In case of a sand mold casting method, the core is removed by breaking. In either case, an as-cast hole can be formed by the core at the same time the cast article is formed, and a subsequent cut-machining is therefore not necessary and a corresponding cost reduction can be attained.

It may occur however that the core is slightly displaced by the effect of a pressure of the molten metal during casting, and the center of the as-cast hole is slightly offset from the center of the through-hole 16. To deal with this problem, following measures will be taken when the through-hole 19 is formed by an as-cast hole. Given that the diameter of the discharge port 47 is represented by d1 and the diameter of the as-cast hole (through-hole 19) is represented by d2, the diameter d2 of the through-hole 19 is set to be larger than the diameter d1 of the discharge port 47 (d2>d1). An amount of offset (difference between d2 and d1) is allowable up to (d2−d1)/2. When a larger offset amount is assumed, a possible counter-measurement would be setting the diameter d2 of the through-hole 19 to a larger value. In case of a through-hole 19 formed by cut-machining, the diameter d2 of the through-hole 19 can be made closer to the diameter d1 of the discharge port 49 provided that d1<d2. Reduction in diameter of the through-hole 19 can thus be achieved.

Figure 5:
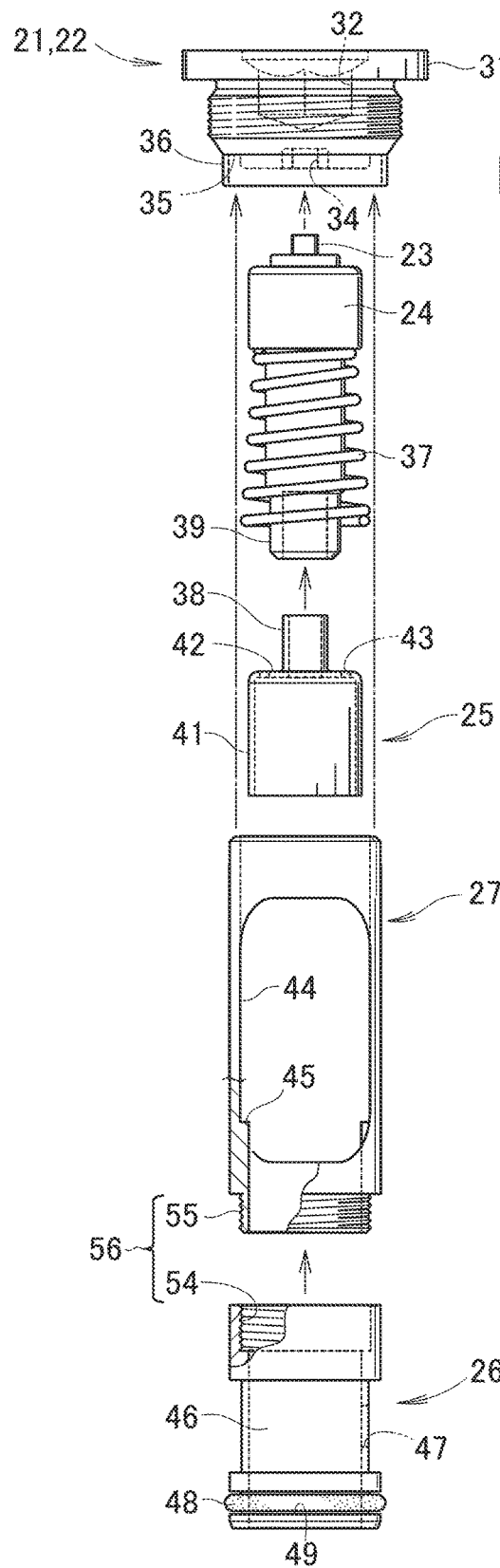
FIG. 5 is an exploded view showing a temperature sensitive valve mechanism according to a modified embodiment of the present invention.

Next, a modified embodiment of the present invention will be described. As shown in FIG. 5, the connecting part 27 and the valve casing 26 can be formed by separate members structurally independent from one another. Other parts are identical to those shown in FIG. 2 and, hence, the same reference characters are used and a detailed description thereof can be omitted. The valve casing 26 has a female screw 54 formed in an upper part thereof, and a male screw 55 is formed on the connecting part 27. The male screw 55 is threaded into the female screw 54 to thereby complete a screw-connected portion 56. Alternatively, the valve casing 26 may be provided with a male screw and the connecting part 27 may be provided with a female screw. By turning the male and female screws 55, 54 relatively to one another, an axial position of the discharge port 47 of the valve casing 26 can be accurately adjusted.

Assembling procedures of the temperature sensitive valve mechanism 20 will be described. As shown in FIG. 6(*a*), the thermoelement 24 is brought into abutment with the flanged plug 22 in a predetermined procedure. The small-diameter extension part 38 of the valve element 25 is fitted in the second cylindrical portion 39 of the thermoelement 24. In this instance, a fitting length between the small-diameter extension part 38 and the second cylindrical portion 39 is fixed after adjustment such that a distance H1 between a lower surface of the flange 31 and a lower end (fore end) of the valve element 25 becomes equal to a predetermined distance. Preferably, press-fitting is employed as a fixing method because adjustment of the fitting length can be easily achieved.

Next, as shown in FIG. 6(*b*), the 27 is fitted in the 36. Preferably, a positioning jig 57 is fitted in the discharge port 47. As an alternative, a non-illustrated positioning jig may be inserted in the valve casing 26 from below in this figure in such a manner as to assume the same axial position as the positioning jig 57.

While the first cylindrical portion 36 for clenching is kept in an unclenched state, the temperature sensitive valve mechanism 20 is immersed in an oil bath having a temperature of 80° C., for example. The temperature sensitive valve mechanism 20 may be immersed in a water bath, but immersion into the oil bath is preferable because it can provide a rust preventive effect and lubrication during initial operation of the temperature sensitive valve mechanism 20. Oil bath immersion causes the valve element 25 to move toward the positioning jig 57, as shown in FIG. 6(*c*). After a predetermined time has passed (in which instance, the thermo-wax 53 has already reached a temperature of 80° C.), an axial position of the connecting part 27 is adjusted such that the valve element 25 is in contact with the positioning jig 57. Position adjustment performed at a service temperature of the lubricating oil (at which the lubricating oil is used frequently) makes it possible to reduce variation in hydraulic characteristics.

After the position adjustment, a distance H2 between the lower surface of the flange 31 and a center of the discharge port 47 has a predetermined length. While keeping this condition, a clenching force F is applied to reduce or contract the diameter of the first cylindrical portion 36. In this instance, clenching is performed such that the clenching force F will cause the first cylindrical portion 36 to undergo deformation over the entire periphery thereof. With this clenching, tilting and center shift of the connecting part 27, which may occur during clenching, can be suppressed with the result that smooth sliding of the valve element 25 and highly precise hydraulic control can be achieved. By virtue of the diameter contraction, the first cylindrical portion 36 is clench-connected to an upper end portion of the connecting portion 27. A first clenched portion 59 is thus formed by and between the first cylindrical portion 36 and the upper end portion of the connecting part 27.

Description will be next made about modifications of the fixing part 21. As shown in FIG. 7(*a*), the fixing part 21 may be in the form of a flangeless plug 61. Alternatively, the fixing part 21 may be formed by a polygonal shank 62 and a flange 31, as shown in FIG. 7(*b*). The polygonal shank 62 is deficient in airtightness and an O-ring 63 is therefore provided on an underside of the flange 31. In addition, a presser plate 64 and bolts 65 are used to prevent the fixing part 21 from floating upward. In the arrangement shown in FIG. 7(*b*), the structural member 10 does not require a female screw. The shape and configuration of the fixing part 21 can be changed in various ways.

Next, description will be made about an embodiment in which the structural member 10 is in the form of a cylinder block 66. FIG. 8(*a*) shows a comparative example in which an oil reservoir 67 is always formed by an oil pan attached to the bottom of a cylinder block 66 of the ordinal engine. In the comparative example, a lubricating oil 68 discharged from the discharge port 47 drops directly into the oil reservoir 67. As a height difference h1 between an oil surface and the discharge port 47 becomes large, larger splashes 69 will be produced. The splashes 69 entrain surrounding air, which will increase air bubbles contained in the lubricating oil. The air bubbles are undesirable because they affect lubrication at lubricating surfaces.

FIG. 8(b) shows an embodiment of the present invention in which the cylinder block 66 has a wall 71 located at a position opposed to the discharge port 47. In the case where provision of the wall 71 is hardly possible, a plate 72 may be provided on the cylinder block 66. Partly because the wall 71 and the plate 72 provide a reduced height difference h2 between themselves and a surface of the lubricating oil, and partly because kinetic energy of the lubricating oil 68 is reduced when the lubricating oil 68 hits on the wall 71 or the plate 72, generation of splashes from the oil surface almost does never take place. It is therefore possible to prevent air bubbles from mixing in the lubricating oil 68.

The structural member 10 should by no means be limited to the oil pump and the cylinder block as in the illustrated embodiments, but other types of structural members such as a reduction gear may be used provided that they have an oil passage.

In the illustrated embodiments, the connecting part 27 is fastened to the fixing part 21 by applying the clenching force F to the first cylindrical portion 36 to thereby reduce the diameter of the first cylindrical portion 36, as explained above with reference to FIG. 6(c). Such fastening structure may be realized by using a circlip or a spring pin in place of the clenching, as will be described later on.

Figure 9:
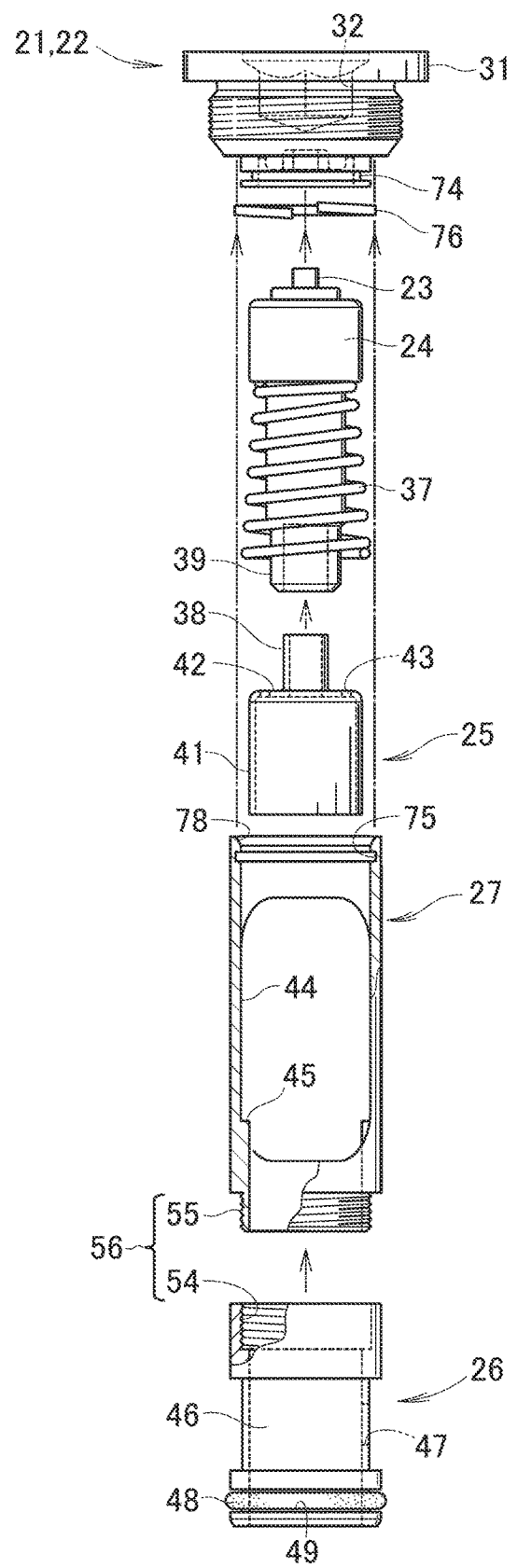
FIG. 9 is an exploded view of a temperature sensitive valve mechanism using a circlip according to the present invention.

As shown in FIG. 9, a clip reception groove 74 is formed in a distal end portion (lower end portion in this figure) of the fixing part 21, and another clip reception groove 75 is formed on an upper end portion of the connecting part 27 which illustrated at a position below the fixing part 21. A circlip 76 is provided to act between the fixing part 21 and the connecting part 27. Other structural parts are the same as those shown in FIG. 5 or FIG. 2, the same reference characters as those shown in FIG. 5 or FIG. 2 are used and a detailed description thereof can be omitted.

The circlip 76 is a machine element formally called a "C-shaped stop ring" as specified by JIS-B2804 where JIS is the abbreviation of Japanese Industrial Standards. The circlip 76 may be called as a stop ring or a retaining ring. Throughout the specification, the term "circlip" is used as it is widely spread.

FIG. 10(b) is provided as a supplementary explanation of the circlip 76 shown in FIG. 10(a). As shown in FIG. 10(b), the circlip 76 is in the form of a spring washer. Given that the circlip 76 has a first thickness t1 corresponding to a solid length of the spring washer (which is equal to a thickness of a wire material forming the spring washer) and a second thickness t2 corresponding to a free length of the spring washer, and the clip reception groove 74 has a groove width t3, these dimensions t1, t2 and t3 are set to satisfy a correlation indicated by inequalities t1<t3 and t1<t2.

More specifically, the groove width t3 of the clip reception groove 74 is preferably 1.05 to 1.40 times as much as the first thickness (solid length) t1 of the circlip 76, and the second thickness (free length) t2 of the circlip 76 is larger than the first thickness (solid length) t1 of the circlip 76 although it can vary depending on the process used for producing the circlip 76.

As shown in FIG. 10(a), the fixing part 21 has a male taper portion 77 formed on a distal end side (lower side) of the clip reception groove 74 in such a manner as to taper or converge in a direction away from the clip reception groove 74. When the circlip 76 is forced to move on and along the male taper portion 77 in a direction indicated by the arrow (4), the diameter of the circlip 76 is gradually enlarged by the male taper portion 77. As the forced movement of the circlip 76 further continues, the circlip 76 moves into fitting engagement with the clip reception groove 74.

The connecting part 27 has a female taper portion 78 formed on a fore end side (upper side) of the clip reception groove 75 in such a manner as to taper or converge toward the clip reception groove 75. When the fixing part 21 is forcibly inserted into the connecting part 27 as indicated by the arrow (5), the diameter of the circlip 76 is gradually contracted by the female taper portion 78. As the forced movement of the fixing part 21 further continues, the circlip 76 moves into fitting engagement with the clip reception groove 75.

Figure 11:
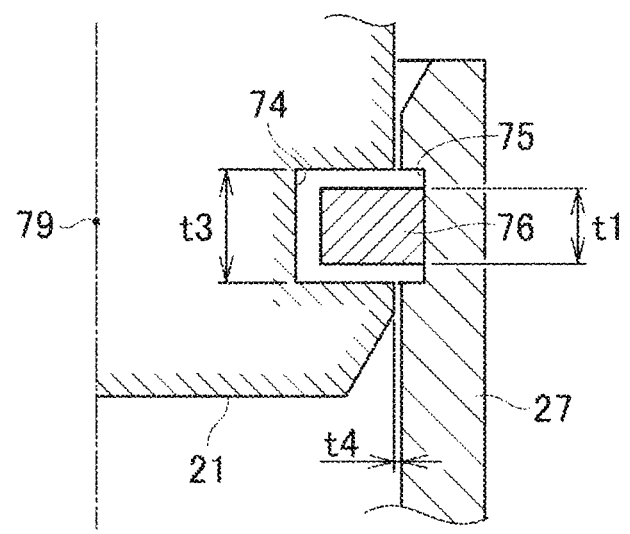
FIG. 11 is a view showing an assembled state of the circlip comprised of a spring washer.

As shown in FIG. 11, by virtue of the fitting engagement of the circlip 76 relative to the clip reception groove 74 of the fixing part 21 and the clip reception groove 75 of the connecting part 7, the fixing part 21 and the connecting part 27 are fastened together. In this instance, a small annular gap or clearance t4 is formed between the fixing part 21 and the connecting part 27. The circlip 76 is resiliently deformable in a radial direction thereof, and there is a gap defined between the clip reception groove 74 and the circlip 76. With this arrangement, the connecting part 27 is allowed to slightly move relatively to the fixing part 21 in a direction perpendicular to a longitudinal axis (axial centerline) 79 of the fixing part 21.

As shown in FIG. 12(a), the pump housing 14 has a first hole 81 for attachment (by screwing) of the fixing part 21, and a second hole 82 for attachment (by insertion) of the connecting part 27. The first hole 81 and the second hole 82 are separated by the main oil passage 15, and it may occur that a central axis 81a of the first hole 81 and a central axis 82a of the second hole 82 are slightly offset to such an extent as denoted by δ1. It may also occur that the central axis 82a of the second hole 82 slightly tilts relative to the central axis 81a of the first hole 81 to such an extent as denoted by δ2. The center offset and the tilting of the central axis may be caused, for example, by manufacturing errors during machining processes, temperature differences while the structural member 10 is in use, or aging after prolonged use of the structural member 10.

The center offset δ1 shown in FIG. 12(a) and the tilt δ2 shown in FIG. 12(b) can be taken out or canceled because the connecting part 27 is slightly movable relative to the fixing part 21 in the perpendicular direction of the longitudinal axis 79 of the fixing part 21, as previously described with reference to FIG. 11. This arrangement facilitates easy attachment of the temperature sensitive valve mechanism 20 relative to the pump housing 14 and insures a long service life of the temperature sensitive valve mechanism 20.

As shown in FIG. 11, a relatively large axial space is present between the circlip 76 and the clip reception groove 74. The axial space can be obtained by calculation from (t3−t1)/2. As previously described with reference to FIG. 10(b), the circlip 76 takes the form of a spring washer. By the effect of a spring force of the spring washer, an amount of axial movement of the connecting part 27 relative to the fixing part 21 shown in FIG. 11 is resiliently limited. The circlip 76 may be formed by a flat washer in place of the spring washer. A typical example of the circlip formed by the flat washer will be described below with reference to FIG. 13.

Figure 13:
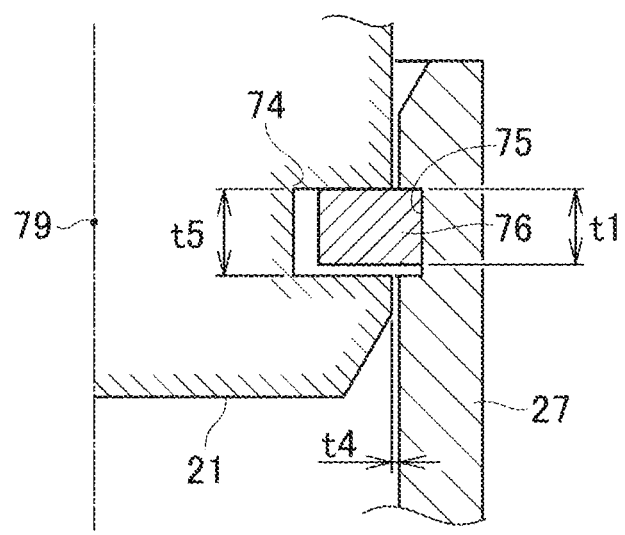
FIG. 13 is a view showing an assembled state of a circlip comprised of a flat washer.

As shown in FIG. 13, the circlip 76 formed by the flat washer (still in the form of a C-shaped stop ring) is used with a clip reception groove 74 having a groove width t5 which is about 1.15 times as much as a thickness t1 of the circlip 76. The circlip 76 can exhibit no spring action and hence allows slight axial movement of the connecting part 27 relative to the fixing part 21. The circlip 76 formed by a flat washer is inexpensive to obtain.

In the case where the cost is regarded as important, the structure shown in FIG. 13 is employed. Alternatively, when the performance is regarded as important, the structure of FIG. 11 is employed. Various shapes and configurations have been proposed for the circlip 76 (regardless of whether they are standardized by JIS or not) and any of these shapes and configuration can be used without limiting to those shown in the illustrated embodiments.

Figure 14:
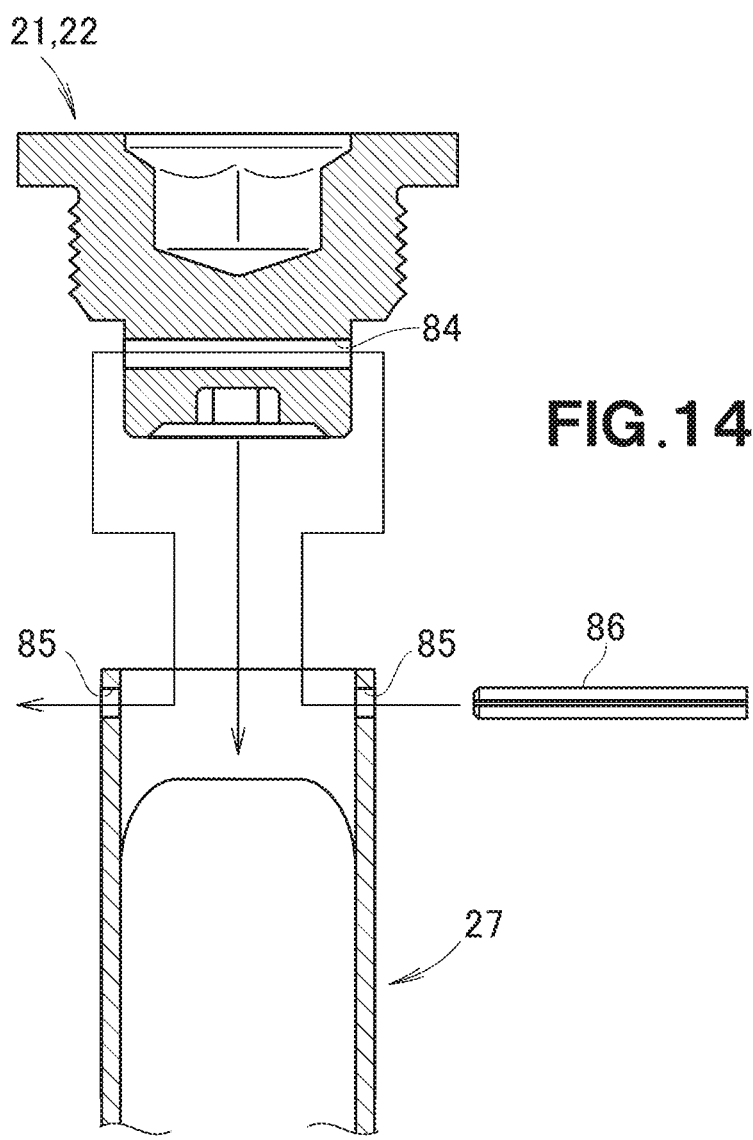
FIG. 14 is an exploded view of a portion of a temperature sensitive valve mechanism according to the present invention in which a spring pin is used.

Description will be next made about an embodiment in which a spring pin 86 is used. As shown in FIG. 14, the fixing part 21 has a pin hole 84 formed therein, and the connecting part 27 has another pin hole 85 formed therein. While the pin holes 84, 85 are axially aligned with each other, the spring pin 86 is press-fitted in the pin holes 84, 85. The spring pin 86 is a machine element formally called a "grooved spring pin" as specified by JIS B 2808 and having a single groove or slit and a C-shaped cross section. By virtue of its C-shaped cross section, the spring pin 86 is resiliently deformable to reduce its diameter when subject to an external force. When the external force is released, the spring pin 86 will restore its original shape and diameter. The spring pin 86 is resiliently deformable in this manner.

As shown in FIG. 15, the fixing part 21 and the connecting part 27 are fastened together by the spring pin 86. By virtue of the resiliency of the spring pin 86 and the presence of a small annular space or clearance t4 between the fixing part 21 and the connecting part 27, the structure may involve a center offset and tilting of the connecting part 27 relative to the fixing part 21.

When the spring pin 86 is to be replaced, a metal rod having a smaller diameter than the pin holes 84, 85 (FIG. 14) and a hummer for striking the metal rod are provided. While one end of the metal rod is in contact with an end of the spring pin 86 shown in FIG. 15, an opposite end of the metal rod is hit by the hummer. This will cause the spring pin 86 to partly project outwardly from the connecting part 27. A projecting part of the spring pin 86 is gripped and pulled outward by a nipper or a pair of pliers until the spring pin 86 is removed from the pin holes 84, 85. The removed spring pin 86 is damaged and hence destroyed. A new spring pin 86 is press-fitted in the pin holes 84, 85 to thereby join the fixing part 21 and the connecting part 27.

The spring pin 86 can be attached and detached more easily than the circlip 76. The circlip 76 is, in many cases, comprised of a tailor-made product, whereas the spring pin 86 is readily available on the market. The spring pin 86 is therefore advantageous over the circlip 76 in terms of the cost.

Figure 16A:
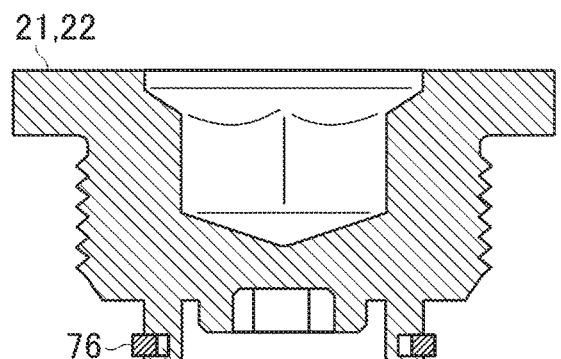

Net, a modified form of the connecting part 27 shown in FIG. 10 will be described with reference to FIGS. 16(a) and 16(b). As shown in FIG. 16(a), the connecting part 27 has a plurality of through-holes 88 formed therein at regular intervals along the clip reception groove 75. The through-holes 88 are holes extending between an outer peripheral surface and an inner peripheral surface of the cylindrical connecting part 27. Other parts are the same as those shown in FIG. 10(a) and the same reference characters as those shown in FIG. 10(a) are used and a further description thereof can be omitted.

The through-holes 88 may be formed by horizontally elongated rectangular holes, square holes, vertically elongated rectangular holes, elliptical holes, oblong holes, or accurate circular holes. The through-holes 88 are preferably comprised of four holes formed at a pitch of 90 degrees, or of three holes formed at a pitch of 120 degrees. The number and pitch of the through-holes are not limited to those in the specific examples stated above. The connecting part 27 is joined to the fixing part 21 by the circlip 76. A cross section taken along line b-b of FIG. 16(a) is shown in FIG. 16(b).

Figure 16B:
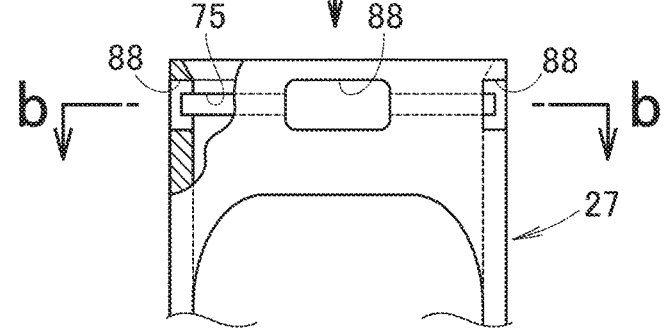

As shown in FIG. 16(b), the connecting part 27 and the fixing part 21 are fastened or joined together by the circlip 76. In this instance, a condition (such as an attachment posture) of the circlip 76 can be confirmed by visual inspection through the through-holes 88. In place of the visual inspection by a human operator, an analysis of images captured by a CCD camera may be used. When a defect on the condition of the circlip 76 is found, jigs 89, 89 are inserted into the through-holes 88 so as to reduce the diameter of the circlip 76. While the circlip 76 is kept in a radially contracted state, the connecting part 27 is detached or separated from the fixing part 21. Then, the circlip 76 is detached from the fixing part 21. With this arrangement, when a defect, such as inaccurate positioning of the valve element 25 at a predetermined working temperature, occurs after assembly, reassembling of the temperature sensitive valve mechanism 20 is possible to perform.

Figure 16C:
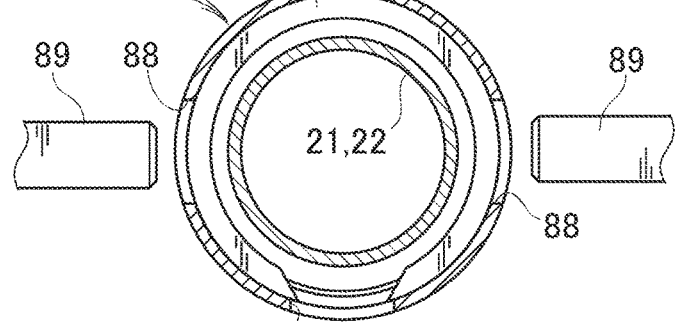

The through-holes 88 may be formed by notched holes which open upward, as shown in FIG. 16(c). Machining of the notched holes is easier than that of the notch-free holes and, hence, a corresponding reduction in machining time can be attained.

It is preferable that the structural member 10, the valve casing 26 and the connecting part 27 shown, for example, in FIG. 7 are formed of the same kind of materials such as aluminum alloys. By thus using the same kind of materials, thermal expansion coefficients of the above-identified parts are nearly equal to one another. It is therefore possible to minimize a clearance between the structural member 10 and the valve casing 26 and a clearance between the structural member 10 and the connecting part 27. As a result, a leakage of the lubricating oil from these clearance can be limited to a minimum.

In the illustrated embodiments shown, for example, in FIG. 7, the seal member 48 is provided between an outer periphery of the valve casing 26 and the structural member 10. The seal member 48 can be omitted when the oil leakage is minimized. Even when the seal member 48 is omitted, a remarkable amount of oil leakage does never take place and, hence, control can be performed with increased accuracy.

The present invention is particularly advantageous when embodied in a temperature sensitive valve mechanism assembled in an oil pump.

Obviously, various minor changes and modifications of the present invention are possible in light of the above teaching. It is therefore to be understood that within the scope of the appended claims the invention may be practiced otherwise than as specifically described.

What is claimed is:

1. A temperature sensitive valve mechanism mounted in a structural member having an oil passage so as to release a lubricating oil to an outside of the oil passage in response to a temperature of the lubricating oil flowing in the oil passage, the temperature sensitive valve mechanism comprising:
a fixing part fixed to the structural member;
a thermoelement disposed in the oil passage and having a first end supported by or made in contact with the fixing part;
a valve element fixed to a second opposite end of the thermoelement;
a valve casing surrounding the valve element; and a connecting part extending from the fixing part in such a manner as to surround the valve element and supporting the valve casing, the connecting part having oil passage through-holes for allowing the lubricating oil to pass therethrough and hit on the thermoelement, wherein the valve casing has a discharge port adapted to be opened and closed by the valve element for releasing the lubricating oil therefrom to the outside of the oil passage, and wherein the connecting part is joined to the fixing part via a clenched portion or a screw-connected portion.

2. The temperature sensitive valve mechanism according to claim 1, wherein the connecting part and the valve casing are formed integrally with each other.

3. The temperature sensitive valve mechanism according to claim 1, wherein the connecting part and the valve casing are separate members structurally independent from one another, and the valve casing is joined to the connecting part via a clenched portion or a screw-connected portion.

4. The temperature sensitive valve mechanism according to claim 1, wherein the connecting part is joined to the fixing part via the clenched portion, and the clenched portion is a portion joined by clenching performed to cause deformation over the entire periphery thereof.

5. A temperature sensitive valve mechanism mounted in a structural member having an oil passage so as to release a lubricating oil to an outside of the oil passage in response to a temperature of the lubricating oil flowing in the oil passage, the temperature sensitive valve mechanism comprising:

a fixing part fixed to the structural member;

a thermoelement disposed in the oil passage and having a first end supported by or made in contact with the fixing part;

a valve element fixed to a second opposite end of the thermoelement;

a valve casing surrounding the valve element; and a connecting part extending from the fixing part in such a manner as to surround the valve element and supporting the valve casing, the connecting part having oil passage through-holes for allowing the lubricating oil to pass therethrough and hit on the thermoelement, wherein the valve casing has a discharge port adapted to be opened and closed by the valve element for releasing the lubricating oil therefrom to the outside of the oil passage, and wherein the connecting part is joined to the fixing part via a circlip.

6. The temperature sensitive valve mechanism according to claim 5, wherein the groove width of a clip reception groove in which the circlip is received is set to be larger than a thickness of the circlip, and the circlip is in the form of a spring washer.

7. The temperature sensitive valve mechanism according to claim 6, wherein the connecting part has a plurality of through-holes provided along the clip reception groove.

8. The temperature sensitive valve mechanism according to claim 1, wherein the structural member, the valve casing and the connecting part are formed of aluminum alloys.

9. The temperature sensitive valve mechanism according to claim 1, wherein the structural member is a cylinder block of an engine, and the cylinder block has a wall or a plate disposed such that the lubricating oil discharged from the discharge port hits on the wall or the plate before dropping into an oil reservoir of the cylinder block.

10. A temperature sensitive valve mechanism mounted in a structural member having an oil passage so as to release a lubricating oil to an outside of the oil passage in response to a temperature of the lubricating oil flowing in the oil passage, the temperature sensitive valve mechanism comprising:

a fixing part fixed to the structural member;

a thermoelement disposed in the oil passage and having a first end supported by or made in contact with the fixing part;

a valve element fixed to a second opposite end of the thermoelement;

a valve casing surrounding the valve element; and a connecting part extending from the fixing part in such a manner as to surround the valve element and supporting the valve casing, the connecting part having oil passage through-holes for allowing the lubricating oil to pass therethrough and hit on the thermoelement, wherein the valve casing has a discharge port adapted to be opened and closed by the valve element for releasing the lubricating oil therefrom to the outside of the oil passage, and wherein the structural member is a cylinder block of an engine, and the cylinder block has a wall or a plate disposed such that the lubricating oil discharged from the discharge port hits on the wall or the plate before dropping into an oil reservoir of the cylinder block.

* * * * *